(12) United States Patent  
Enström et al.

(10) Patent No.: US 7,395,735 B2  
(45) Date of Patent: Jul. 8, 2008

(54) CHANGE-SPEED GEARBOX

(75) Inventors: Hans Enström, Lerum (SE); Andreas Hegerath, Bergheim (DE)

(73) Assignee: Getrag Ford Transmissions GmbH, Cologne (DE)

( * ) Notice: Subject to any disclaimer, the term of this patent is extended or adjusted under 35 U.S.C. 154(b) by 282 days.

(21) Appl. No.: 11/406,739

(22) Filed: Apr. 19, 2006

(65) Prior Publication Data

US 2006/0230854 A1    Oct. 19, 2006

(30) Foreign Application Priority Data

Apr. 19, 2005    (EP)    ................... 05103117

(51) Int. Cl.
*F16H 37/06*    (2006.01)
(52) U.S. Cl. ....................................... 74/661
(58) Field of Classification Search ................. 74/661, 74/331; 180/65.7
See application file for complete search history.

(56) References Cited

U.S. PATENT DOCUMENTS

| | | |
|---|---|---|
| 5,715,727 A | 2/1998 | Janiszewski |
| 5,799,536 A | 9/1998 | Janiszewski |
| 7,249,537 B2 * | 7/2007 | Lee et al. ................ 74/661 |

FOREIGN PATENT DOCUMENTS

| | | |
|---|---|---|
| EP | 0 733 825 | 9/1996 |
| EP | 1 077 336 | 2/2001 |
| EP | 1 243 788 | 9/2002 |
| EP | 1 245 863 | 10/2002 |
| EP | 1 443 245 | 8/2004 |
| EP | 1 531 286 | 5/2005 |
| WO | WO 2005/068876 | 7/2005 |

* cited by examiner

*Primary Examiner*—Dirk Wright
(74) *Attorney, Agent, or Firm*—Alexander R. Schlee

(57) ABSTRACT

A change-speed gearbox, in particular for motor vehicles such as hybrid passenger cars and small trucks, comprising input and output shafts, clutches, and gear wheel pairs with fixed and loose wheels. The gearbox provides at least one forward gear by means of the gear wheel pairs, has a gear box unit for a second forward gear, and has in addition an auxiliary drive.

20 Claims, 4 Drawing Sheets

CHANGE-SPEED GEARBOX

This application claims the priority of the European Patent Application EP 05103117.7 having a filing date of Apr. 19, 2005, the entire content of which is herewith incorporated by reference.

BACKGROUND OF THE INVENTION

The invention relates to a change-speed gearbox, in particular for motor vehicles such as hybrid passenger cars or small trucks.

U.S. Pat. No. 5,715,727 discloses a change-speed gearbox which comprises an input shaft and two output shafts. Here, the input shaft can be connected to an engine by means of a clutch. The two output shafts engage with a drive output.

Furthermore, the change-speed gearbox in U.S. Pat. No. 5,715,727 has several gear wheel pairs in order to connect the first input shaft to one output shaft or to the other output shaft. Here, each gear wheel pair has one fixed wheel and one loose wheel. Each gear wheel pair is additionally assigned a gear shift clutch, by means of which the loose wheel of a gear wheel pair can be connected in a rotationally fixed manner to the shaft which bears the loose wheel. A torque is transmitted between the input shaft and the respective output shaft with a certain transmission ratio by means of the rotationally fixedly connected loose wheel, so that one forward gear is established per gear wheel pair.

In order to implement a reverse gear, the change-speed gearbox has a gearbox unit. The gearbox unit engages with that gear wheel pair which establishes a first forward gear of the change-speed gearbox. Here, the gearbox unit is responsible for the transmission of torque to a third output shaft which, like the other two output shafts, engages with the drive output.

If the change-speed gearbox in U.S. Pat. No. 5,715,727 is placed in reverse gear, the gear shift clutch which is assigned to the gear wheel pair of the first gear is simultaneously opened, so that the gear wheel pair of the first gear transmits the torque of the input shaft to the third output shaft without transmitting torque to the first or the second output shaft.

A number of gear wheels are arranged on the input shaft corresponding to the number of forward gears, the gear wheels arranged adjacent to one another on the input shaft significantly influencing the axial installation length of the change-speed gearbox. The axial installation length can be a critical variable in particular in an application in a motor vehicle on account of the small amount of space which is available there.

SUMMARY OF THE INVENTION

The invention is therefore based on the object of providing a change-speed gearbox which has a comparatively short axial installation length without the number of forward gears being reduced.

The object on which the invention is based is achieved by means of a change-speed gearbox having the features of claim 1. Preferred exemplary embodiments can be gathered from the subclaims.

The number of gear wheels, for the various forward gears, situated on the input shaft can be reduced in that the gearbox unit comprises at least one loose wheel with an assigned gear shift clutch, and in that a further forward gear can be implemented by means of the gearbox unit. This opens up the possibility of forming the input shaft to be shorter, as a result of which the axial installation length of the change-speed gearbox can generally be reduced.

If the additional forward gear which can be selected by means of the gearbox unit is selected, the gear wheel pair which engages with the gearbox unit and comprises a loose wheel and a fixed wheel serves only to transmit torque from the input shaft to the gearbox unit. If the additional forward gear is not selected, the gear wheel pair can alternatively be used to transmit torque between the input shaft and the first or second output shaft. For this purpose, the gear shift clutch which is assigned to the loose wheel of the gear wheel pair is closed, it being necessary to simultaneously ensure that the gear shift clutch of the additional forward gear, preferably arranged on the third output shaft, is open.

The drive output can be rotated in a rotational direction counter to the forward gears by means of the auxiliary drive. A mechanical reverse gear comprising at least one additional gear wheel pair can thus be dispensed with on account of the auxiliary drive in the change-speed gearbox.

In one preferred exemplary embodiment, the auxiliary drive is operatively connected to the input shaft. If the motor vehicle which is equipped with the change-speed gearbox is to reverse, the torque of the auxiliary drive is transmitted to the drive output via the input shaft, a gear wheel pair and via one of the output shafts. This has the advantage that the transmission ratios defined by the individual gear wheel pairs can also be utilized when the motor vehicle reverses.

In addition, the auxiliary drive can also be used for other tasks. By way of example, it can be used to assist the engine if a high torque is required (if, for example, the motor vehicle is to be accelerated quickly). Furthermore, the auxiliary drive can also be used to synchronize the speeds of the input shaft and of one of the output shafts in order to permit engagement of a gear shift clutch to give a rotationally fixed connection of a loose wheel to a corresponding shaft. The auxiliary drive can thus replace conventional synchronization units, only their so-called dogging parts remaining necessary for a positive connection between a shaft and a loose wheel. Here, the auxiliary drive can both accelerate and brake a shaft in the change-speed gearbox to a synchronization speed, so that a corresponding gear shift clutch can engage without a speed difference when shifting up and when shifting down.

In addition, the auxiliary drive can also be used to synchronize the speed of the input shaft with the speed of the engine. If the engine and input shaft are running at the same speed, positive engagement of a clutch is possible with little force, so that the force required for engaging the clutch can be considerably reduced in comparison with conventionally used friction clutches or slipping clutches. Furthermore, the construction of the clutch is simplified since a slipping mode of the clutch and corresponding heat generation can be eliminated as a result of the synchronization by the auxiliary drive. In summary, the construction of the change-speed gearbox and also of the clutch connected upstream of the change-speed gearbox can be simplified by using the auxiliary drive since the conventional means for speed synchronization can be dispensed with.

In one preferred exemplary embodiment, a second input shaft is provided which is arranged coaxially with respect to the at least one input shaft or, in other words, coaxially with respect to the first input shaft, it being possible for the second input shaft to be connected to the engine by means of a second clutch. The change-speed gearbox according to the invention thus constitutes a twin-clutch gearbox with which shifting is possible under load. The twin-clutch gearbox can be divided into a first partial transmission and a second partial transmission, each of which is assigned a respective clutch.

While, for example, during operation of the change-speed gearbox, the first partial transmission is connected to the engine by means of the first clutch and transmits a torque from the engine to the drive output, a gear can be selected in the second partial transmission, which is disconnected from the engine by means of the second, open clutch, so that after the gear has been selected, the torque of the engine can be gradually transferred over to the second partial transmission, it being possible for both clutches to transmit torque in a slipping fashion in a transition range as long as both the first and the second clutches are slipping clutches.

In a twin-clutch gearbox having two input shafts, the auxiliary drive advantageously comprises two drive units which are each operatively connected to a respective input shaft. The two input shafts can thus be accelerated and braked to a desired speed completely independently of one another by means of the respective drive unit. The acceleration or braking of an input shaft can, as described above, serve to synchronize the speed of the input shaft with the speed of an output shaft for the purpose of selecting a gear, or to synchronize the speed of the input shaft with the speed of the engine.

The auxiliary drive preferably comprises at least one electric machine which can be operated both as an electric motor and as a generator. By way of example, the two drive units can be simultaneously operated as electric motors or simultaneously as generators. It is also possible that one drive unit can be operated as a motor while the other drive unit is used as a generator. The drive units can thus be controlled independently of one another.

In one preferred exemplary embodiment, one of the drive units of the auxiliary drive is arranged coaxially with respect to the input shaft or to the input shafts. In order to keep the axial installation length of the change-speed gearbox as small as possible, the drive unit which is arranged coaxially with respect to the input shaft or to the input shafts can engage around the first clutch and/or the second clutch in the radial direction. Such an arrangement of the drive unit has no influence on the axial installation length of the change-speed gearbox if the axial width of the drive unit does not exceed the axial width of the one clutch or, in the case of two clutches, does not exceed the total axial width of the first of the second clutch.

One of the drive units of the auxiliary drive can be connected to one of the input shafts by means of a chain. The term "chain" is intended here to represent all possible closed traction means (such as, for example, V-belts). The position of the drive unit can be selected in a relatively arbitrary fashion as a result of the drive connection by means of a chain, and this fundamentally simplifies the structural implementation of the change-speed gearbox in a motor vehicle having a low availability of space. One of the drive units of the auxiliary drive can also alternatively be connected to one of the input shafts by means of a spur gear stage. One gear wheel of the spur gear stage can be a fixed wheel of one of the input shafts or a loose wheel which is operatively connected to one of the input shafts.

The gearbox unit preferably comprises a first gear wheel which meshes with a gear wheel of the gear wheel pair which engages with the gearbox unit, said first gear wheel rotating about an axis which is different than an axis of the third output shaft. Here, the gear wheel of the gear wheel pair which engages with the gearbox unit is arranged on the first or the second output shaft. It can be ensured by means of the first gear wheel with its own axis that the respective output shaft (the first or the second output shaft) and the third output shaft rotate in the same direction. The gearbox unit consequently permits an additional forward gear.

The gearbox unit can comprise a second gear wheel which is arranged on the third output shaft and is operatively connected to the first gear wheel. In addition, the gearbox unit can comprise an intermediate shaft having a third gear wheel which meshes with the second gear wheel. Here, the first gear wheel is expediently likewise arranged on the intermediate shaft. The ratio of the rotational speeds of the respective output shaft (the first or the second output shaft) and of the third output shaft can be set by means of the first gear wheel and the third gear wheel having different diameters.

In one preferred exemplary embodiment, the second gear wheel, which is arranged on the third output shaft, is embodied as a loose wheel. A gear shift clutch is assigned to the loose wheel, by means of which gear shift clutch the loose wheel can be connected in a rotationally fixed manner to the third output shaft. When a loose wheel is rotationally fixedly connected, a torque can thus be transmitted from the input shaft to the third output shaft via the gear wheel pair which engages with the first gear wheel of the gearbox unit, the output shaft in turn transmitting the torque on to the drive output.

Each of the fixed wheels of the respective gear wheel pairs are preferably arranged on the at least one input shaft or on the input shafts. As already mentioned above, the length of the input shaft or the length of the two input shafts can be the determining factor for the axial installation length of the change-speed gearbox. If only fixed wheels are arranged on the input shafts, the arrangement of gear shift clutches on the input shaft, which required additional axial installation space, is not necessary.

In order to further save axial installation space, it can be provided that a fixed wheel of a first gear wheel pair simultaneously forms the fixed wheel of a second gear wheel pair. Both the loose wheel of the first gear wheel pair and the loose wheel of the second gear wheel pair would thus mesh with the fixed wheel.

Each output shaft preferably bears, in a rotationally fixed manner, a respective small gear wheel or pinion which meshes with a large gear wheel or ring gear. The interaction of a pinion and the large gear wheel establishes (in each case) a final transmission ratio stage of the change-speed gearbox. The pinions can lie in one plane and can each have the same diameter.

The first and second output shafts preferably lie in one plane, which the at least one input shaft is at a distance from. This feature can also be correspondingly implemented in change-speed gearboxes having two coaxial input shafts.

The shafts can be accommodated in a gearbox housing which is responsible for the rotatable mounting of the individual shafts. A gear wheel for transmitting torque in a rotational direction counter to the forward gears can also be provided, which gear wheel is expediently arranged on the third output shaft (gear wheel for the reverse gear). The gear wheel can be embodied as a loose wheel so that torque is transmitted to the third output shaft only when a gear shift clutch which is assigned to the loose wheel is closed. A switchable, mechanical reverse gear would thus be provided. By way of example, a change-speed gearbox having seven forward gears can be implemented as a result, in which two loose wheels are arranged on the first output shaft, four loose wheels are arranged on the second output shaft and two loose wheels for a forward gear and for the reverse gear are arranged on the third output shaft. This 7-gear change-speed gearbox can be embodied as a twin-clutch gearbox, in which gears I, III, V, VII can be assigned to a first partial transmission and gears II, IV, VI and the reverse gear R can be assigned to a second partial transmission.

The gear wheel for the reverse gear can engage with a double loose wheel which comprises a first gear wheel part and a second gear wheel part, the first gear wheel part meshing with the gear wheel for the reverse gear, and the second gear wheel part being used as a loose wheel for a forward gear, preferably for the second forward gear. A diameter of the first gear wheel part can be smaller than a diameter of the second gear wheel part.

Alternatively, or in addition, a (further) double loose wheel can be used to transmit the torque of the engine to the third output shaft, one gear wheel part of the double loose wheel of the gearbox unit according to the invention being assigned for the further forward gear and the other gear wheel part serving as a forward gear in which torque is transmitted from the first or second output shaft to the drive output.

BRIEF DESCRIPTION OF THE DRAWINGS

The invention is explained in more detail on the basis of the exemplary embodiment illustrated in the figures, in which.

DETAILED DESCRIPTION OF THE DRAWINGS

Figure 1:
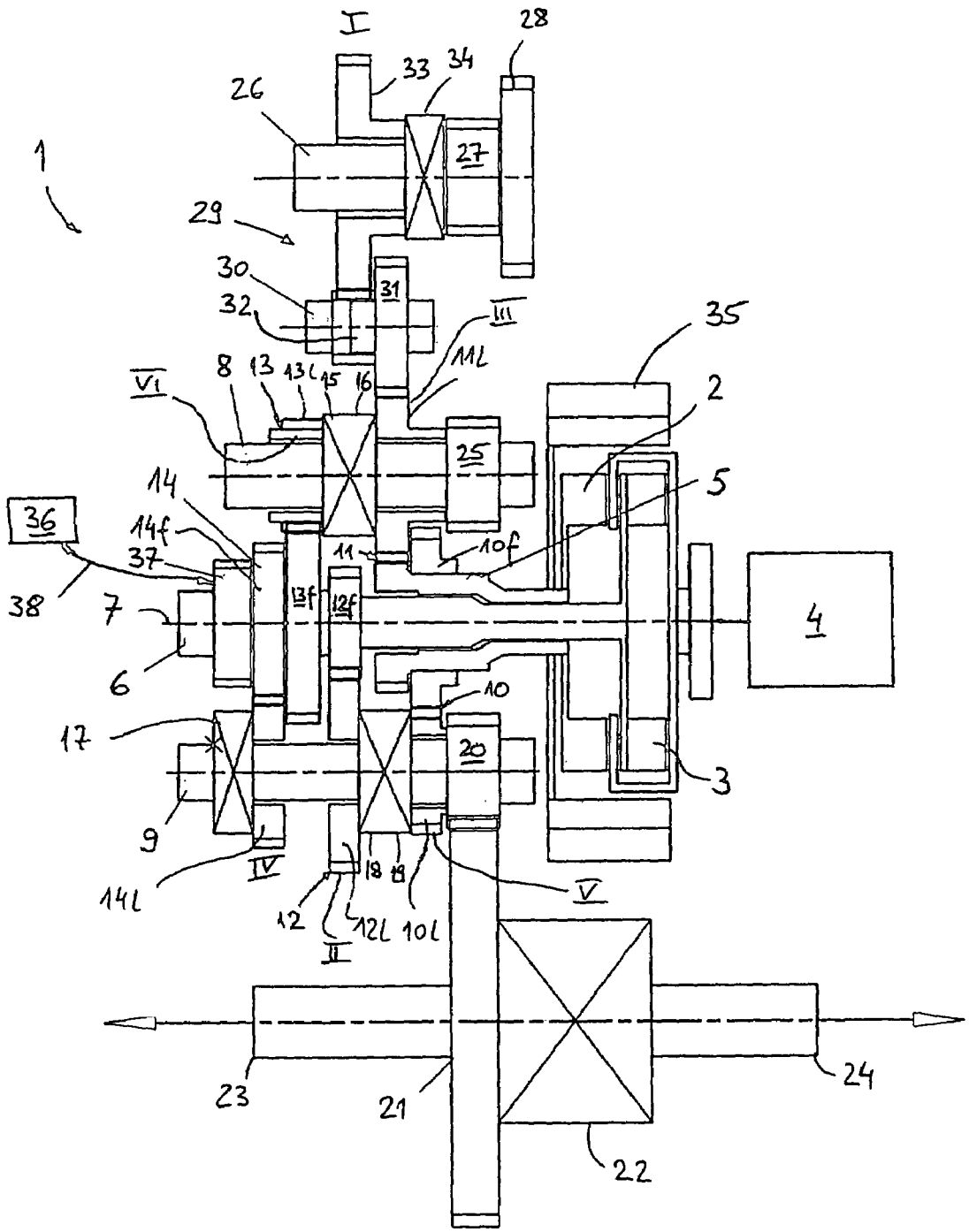
FIG. 1 shows a schematic illustration of a change-speed gearbox according to the invention from the side.
Figure 2:
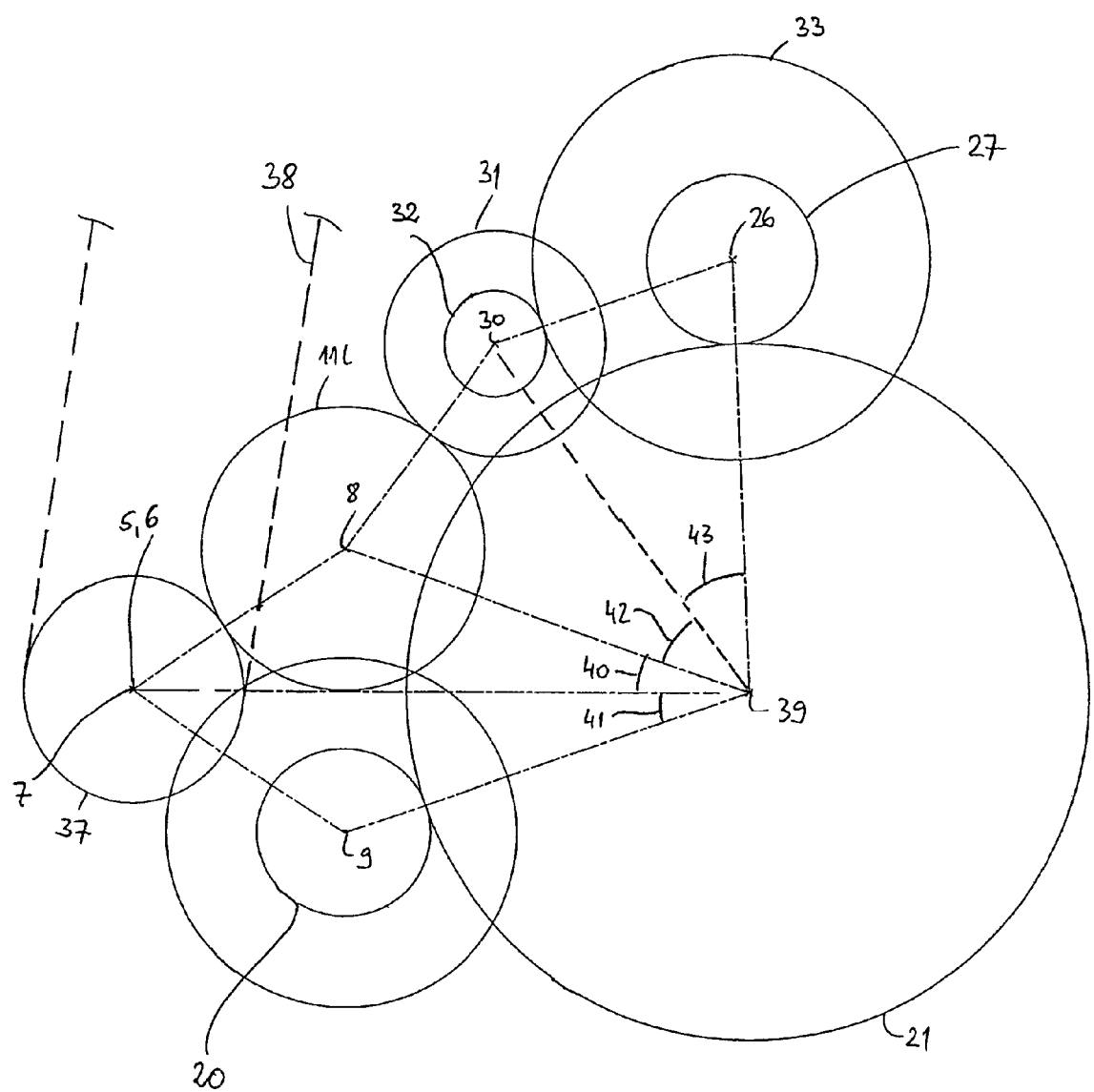
FIG. 2 schematically shows the change-speed gearbox in FIG. 1 in cross section.

FIGS. 1 and 2 show a change-speed gearbox which is designated as a whole by 1. The change-speed gearbox is embodied as a twin-clutch gearbox having a first clutch 2 and having a second clutch 3. In a closed state, the first clutch 2 connects an internal combustion engine 4 to a first input shaft 5. The second clutch 3 serves to connect the internal combustion engine 4 to a second input shaft 6. The two clutches 2, 3 and the two input shafts 5, 6 are arranged coaxially and have a common axis which is denoted by 7.

The change-speed gearbox 1 additionally has a first output shaft 8 and a second output shaft 9. The respective rotational axes of the two output shafts 8, 9 are parallel to, but at a distance from, the axis 7. Five gear wheel pairs 10, 11, 12, 13, 14 are provided in order to connect the two input shafts 5, 6 to the two output shafts 8, 9. Here, each gear wheel pair comprises one fixed wheel and one loose wheel, the fixed wheel being denoted with the index f and the loose wheel being denoted with the index 1. By way of example, a fixed wheel 10f of the gear wheel pair 10 is arranged in a rotationally fixed manner on the first input shaft 5 and meshes with a loose wheel 10l which is situated on the second output shaft 9. As can be seen in FIG. 1, only the fixed wheels 10f, 11f, 12f, 13f, 14f of the gear wheel pairs 10 to 14 are arranged on the input shafts 5, 6.

Several gear shift clutches 15, 16, 17, 18, 19 are arranged on the output shafts 8, 9. The gear shift clutches 15 to 19 are illustrated in highly schematized form in FIG. 1 by means of a rectangle with diagonal lines drawn in, two adjacent gear shift clutches in some cases being represented by only one rectangle. By way of example, the gear shift clutch 19 serves to connect the loose wheel 10l in a rotationally fixed manner to the second output shaft 9. If such a rotationally fixed connection is established between the loose wheel 10l and the output shaft 9, a torque can be transmitted from the first input shaft 5 to the second output shaft 9 by means of the gear wheel pair 10. If the gear shift clutch 19 is closed or engaged, a fifth forward gear of the change-speed gearbox 1 is selected. The individual forward gears II, III, IV, V, VI, which are each established respectively by one of the gear wheel pairs 10, 11, 12, 13, 14, are designated in FIG. 1 by Roman numerals.

The second forward gear II is thus formed by the gear wheel pair 12 whose fixed wheel 12f is arranged on the second input shaft 6 and whose loose wheel 12l is arranged on the second output shaft 9. The third forward gear III is formed by the gear wheel pair 11, whose fixed wheel 11f is arranged on the first input shaft 5 and whose loose wheel 11l is arranged on the first output shaft 8. The fourth forward gear IV is formed by the gear wheel pair 14, whose fixed wheel 14f is arranged on the second input shaft 6 and whose loose wheel 14l is arranged on the second output shaft 9.

When the fifth gear V is selected, the torque from the second output shaft 9 is transmitted to a large gear wheel or ring gear 21 via a gear wheel or pinion 20 which is rotationally fixedly connected to the second output shaft 9. The torque is passed from the ring gear 21 into a differential 22, which is illustrated in schematized form in FIG. 1 as a rectangle with diagonal lines drawn in. The differential 22 distributes the torque between a first axle 23 and a second axle 24.

In addition to the gear wheel 20, a gear wheel 25 meshes with the ring gear 21, which gear wheel 25 is rotationally fixedly connected to the first output shaft 8. By way of example, torque can be transmitted from the second input shaft 6 to the ring gear 21 when the gear shift clutch 15 is closed. The gear wheel pair 13 then passes the torque from the second input shaft 6 to the first output shaft 8 by means of a loose wheel 13l which is then rotationally fixedly connected to the first output shaft 8.

In addition to the first output shaft 8 and the second output shaft 9, the change-speed gearbox 1 comprises a further output shaft, a third output shaft 26. Said third output shaft 26 also has a rotationally fixedly arranged gear wheel 27 which engages with the ring gear 21. Moreover, the third output shaft 26 is rotationally fixedly connected to a parking wheel 28, by means of which the ring gear 21 can be locked via the gear wheel 27. The gear wheels 20, 25 and 27 each have the same diameter and lie in a common plane.

A gearbox unit 29 serves to produce a connection between the loose wheel 11l and the third output shaft 26. Here, the gearbox unit 29 comprises an intermediate shaft 30, on which a gear wheel 31 is arranged in a rotationally fixed manner. A further gear wheel 32 is arranged on the intermediate shaft 30, which gear wheel 32 is likewise rotationally fixedly connected to the intermediate shaft 30 and meshes with a loose wheel 33 which is borne by the third output shaft 26. In an engaged or closed state, a gear shift clutch 34 which is assigned to the loose wheel 33 serves to produce a rotationally fixed connection between the loose wheel 33 and the third output shaft 26.

As can be seen from the Roman numeral I at the gear wheel 33, the first forward gear of the change-speed gearbox 1 is selected by means of the gear shift clutch 34.

Furthermore, the change-speed gearbox 1 comprises a first electric machine 35 and a second electric machine 36. Here, the first electric machine 35 is arranged coaxially with respect to the input shafts 5, 6 and engages around the two clutches 2, 3 in the radial direction. Here, the axial dimensions of the first electric machine 35 approximately correspond to the axial dimensions of the clutches 2, 3, so that the electric machine 35 has very little or no influence on the axial installation length of the change-speed gearbox 1. The electric machine 35 is connected to the first input shaft 5.

The electric machine 36 is connected to the second input shaft 6 by means of a gear wheel 37 and by means of a closed traction means in the form of a chain 38 (cf. FIG. 2). In FIG. 1, the chain 38 is schematically illustrated as a double arrow, which is intended to indicate that there is a connection between the electric machine 36 and the second shaft 6 with the gear wheel 37 arranged thereon.

The electric machines 35, 36 can perform a very wide variety of tasks during operation of the change-speed gearbox 1. By way of example, they are suitable for synchronizing the speed of the input shafts respectively connected to them either with the speed of an output shaft or with the speed of the internal combustion engine. These synchronizations make it possible for the gear shift clutches in the change-speed gearbox 1 and also the first clutch 2 and the second clutch 3 to be embodied as positive clutches without a slipping mode.

The change-speed gearbox 1 provides no mechanical reverse gear. A reverse gear of the change-speed gearbox 1 is implemented in that one of the two electric machines 35, 36 rotates in a direction which opposes the rotation of the internal combustion engine 4. By way of example, the torque of the first electric machine 35 can be used for reversing the vehicle in which the change-speed gearbox 1 is installed.

As can be seen in FIG. 1, the individual gear wheel pairs 10, 11, 12, 13, 14, the gear shift clutches 15, 16, 17, 18, 19 and the gearbox unit 29 are arranged on one side of the change-speed gearbox 1 if the plane in which the pinions 20, 25, 27 and the ring gear 21 lie is regarded as a reference plane which divides the change-speed gearbox into two sides. The clutches 2, 3 and the engine 4 are arranged on the other side of said reference plane. It can alternatively be provided that at least parts of the gearbox unit 29 are arranged on the side of the clutches 2, 3. The intermediate shaft 30 can thus extend in the direction of the clutches 2, 3 from the longitudinal plane of the gear wheel 31, the loose wheel 33 and the gear wheel 32 then being situated to the right of the pinion 27 in the illustration of FIG. 1.

It can be seen from FIG. 2 how the individual shafts 5, 6, 8, 9, 26, 30 are arranged relative to a rotational axis 39 of the ring gear 21. In the illustrated exemplary embodiment, an angle 40, which is enclosed by the straight connecting line between the rotational axis 7 and the rotational axis 39 and by the straight connecting line between the rotational axis of the first output shaft 8 and the rotational axis 39, is between 15 and 25 degrees and is approximately 20 degrees. An angle 41 which correspondingly designates the relative position of the input shafts 5,6 to the second output shaft 9 is likewise between 15 and 20 degrees and is approximately 20 degrees. An angle 42 which designates the relative position of the first output shaft 8 relative to the intermediate shaft 30 is between 30 and 40 degrees and is approximately 35 degrees. Finally, a further angle 43, which is between 30 and 40 degrees and is approximately 35 degrees, can be seen in FIG. 2.

The method with which the change-speed gearbox 1 operates is to be described on the basis of a gear shift from the reverse gear to the first (forward) gear I and from the first gear I to the second gear II, as an example also for gear shifts between other gears.

If the vehicle in which the change-speed gearbox 1 is installed is stationary and the first clutch 2 and the second clutch 3 are each in an open state, the two input shafts 5, 6 are likewise stationary, even if the engine 4 is running.

In order to now reverse the vehicle, the first electric machine 35 rotates in a direction which opposes the rotational direction predetermined by the engine 4. This causes a corresponding rotation of the first input shaft 5 which is connected to the electric machine 35. Here, at least the gear shift clutches 16, 18 of the change-speed gearbox 1 are in an open state. The gear shift clutch 34 is in the closed state and thus connects the loose wheel 33 in a rotationally fixed manner to the third output shaft 26. The torque generated by the first electric machine 35 is transmitted from the first input shaft 5 to the loose wheel 11$l$ via the fixed wheel 11$f$. No torque is transmitted from the loose wheel 11$l$ to the first output shaft 8, since the gear shift clutch 16 which is assigned to the loose wheel 11$l$ is not closed. Rather, the torque is transmitted from the loose wheel 11$l$ to the gear wheel 31, from where it is passed on to the loose wheel 33 via the intermediate shaft 30 and the gear wheel 32. Since the loose wheel 33 is rotationally fixedly connected to the third output shaft 26 on account of the closed gear shift clutch 34, torque is transmitted via the gear wheel 27 to the ring gear 21 and thus to the first and second axle shafts 23, 24.

In order to now move from reverse into the first gear, the first input shaft 5 is braked by means of the electric machine 35. The first clutch 2, as long as it is embodied as a slipping clutch and no synchronization of the speed of the input shafts with the speed of the engine 4 is provided by means of the auxiliary drive, is then closed, the internal combustion engine 4 now driving the first input shaft 5. As is the case in reverse (see above), torque is now transmitted from the first input shaft 5 to the ring gear 21 via the gear wheel pair 11, via the intermediate shaft 30 and via the third output shaft 26, the individual gearbox parts now however rotating in another direction. Here, the gear shift clutch 34 remains closed while all the other gear shift clutches remain open.

In order to now shift into the second gear, the gear shift clutch 18 is closed, so that the loose wheel 12$l$ is rotationally fixedly connected to the second output shaft 9. During switching of the gear shift clutch 18, the second clutch 3, by means of which the second input shaft 6 can be connected to the internal combustion engine 4, is open. In order to engage the gear shift clutch 18, it is necessary to synchronize the speed of the second input shaft 6 with the speed of the second output shaft 9. This synchronization can be performed by the second electric machine 36. If the second forward gear is now selected, the first clutch 2 is opened and the second clutch 3 is simultaneously closed. The two clutches 2, 3 thus simultaneously transmit torque in slipping mode in a certain transition range. This makes gear shifting possible with no interruption in torque.

Figure 3:
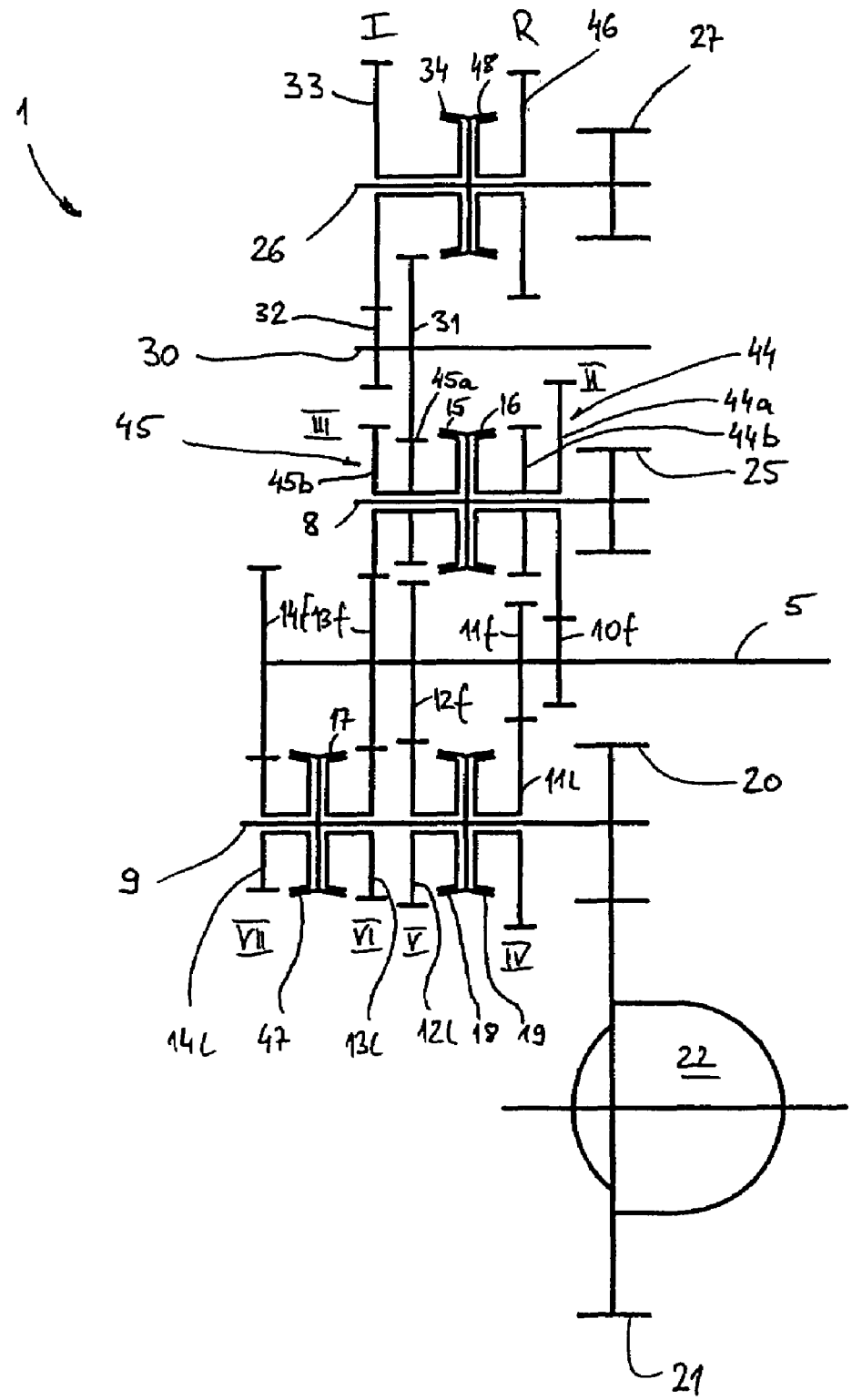
FIG. 3 shows a schematic illustration of a second exemplary embodiment of the invention.
Figure 4:
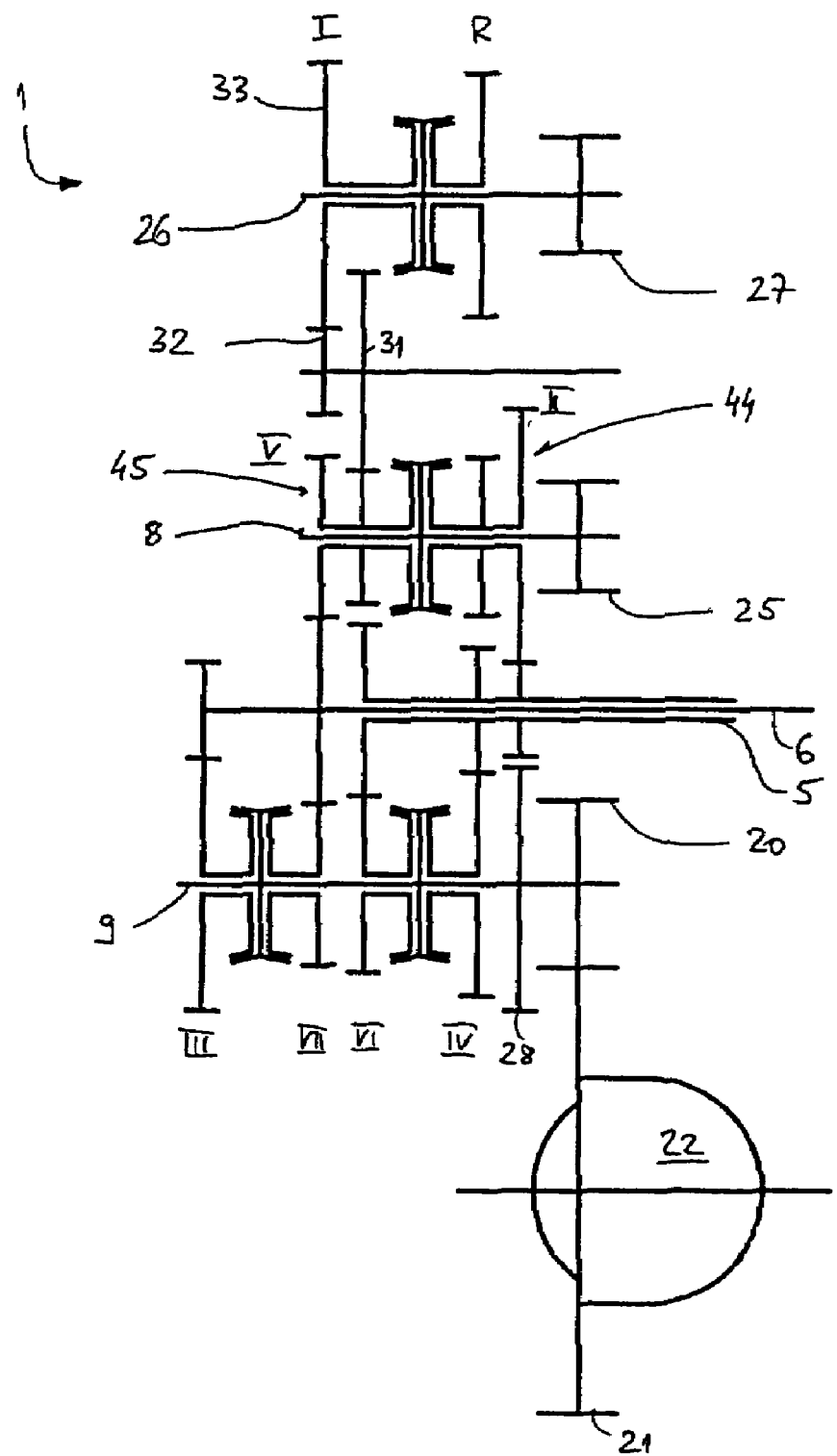
FIG. 4 shows a schematic illustration of a third exemplary embodiment of the invention.

FIGS. 3 and 4 show further exemplary embodiments of the change-speed gearbox according to the invention. Identical, similar or comparable components to the components of the exemplary embodiment in FIGS. 1 and 2 are designated here with the same reference designations. For clarity, the drive units 35, 36 are not illustrated in FIGS. 3 and 4. It should however be pointed out at this stage that the change-speed gearboxes according to FIGS. 3 and 4 can also be used without drive units. In this case, these change-speed gearboxes constitute conventional change-speed gearboxes, that is to say without the capability of a hybrid mode by means of additional drive units.

FIG. 3 shows a change-speed gearbox 1 having seven forward gears. The input shaft 5 bears five fixed wheels 10$f$, 11$f$, 12$f$, 13$f$, 14$f$. The first output shaft 8 bears two double loose wheels 44, 45, while the second output shaft 9 bears the four loose wheels 11$l$, 12$l$, 13$l$, 14$l$. It should be noted that the fixed wheel 13$f$ is simultaneously operatively connected both to the double loose wheel 45 and to the loose wheel 13$l$. The gear wheel 13$f$ thus serves as a fixed wheel of two different gear wheel pairs, by means of which the input shaft can be rotationally fixedly connected to the first output shaft 8 by means of the gear wheel pair having the gear wheels 13$f$, 45, or to the second output shaft 9 by means of the gear wheel pair having the gear wheels 13$f$, 13$l$.

The third output shaft 26 bears the loose wheel 33 and a further loose wheel 46. The pinion 27 is rotationally fixedly connected to the third output shaft 26, which pinion 27 meshes with the ring gear 21. The pinions 20 and 25 additionally mesh with said ring gear 21, as a result of which it is made possible for torque to be transmitted from the first and second output shafts 8, 9 to the drive output.

Furthermore, FIG. 3 shows the intermediate shaft 30 with the gear wheel 31 and the gear wheel 32. The gear wheel 32 has a smaller diameter than the gear wheel 31 and meshes with the loose wheel 33 on the third output shaft 26. The gear wheel 31 meshes with a first gear wheel part 45a of the double loose wheel 45. A second gear wheel part 45b of the double loose wheel 45 meshes with the fixed wheel 13f. Here, the gear wheel parts 45a, 45b have different diameters.

The double loose wheel 44 comprises a first gear wheel part 44a and a second gear wheel part 44b. The gear wheel part 44a meshes with the fixed wheel 10f. The second gear wheel part 44b meshes with the gear wheel 46.

The roman numerals I to VII designate the forward gears which are established by means of the individual gear wheel pairs or by means of several gear wheel pairs. In contrast to the change-speed gearbox in FIGS. 1 and 2, the change-speed gearbox 1 in FIG. 3 has a mechanical reverse gear R. The individual gears can be selected by means of the gear shift clutches 15, 16, 17, 18, 19, 34 and by means of two further gear shift clutches 47, 48.

By way of example, the reverse gear R is selected when the gear shift clutch 48 is closed and the loose wheel 46 is thus rotationally fixedly connected to the third output shaft 26. The torque flow from the input shaft 5 to the ring gear 21 passes via the fixed wheel 10f, via the double loose wheel 44 having the gear wheel parts 44a, 44b which are rotationally fixedly connected to one another, via the loose wheel 46, via the third output shaft 26 and via the gear wheel 27.

If the reverse gear is operational, all the other gear shift clutches are open. This is also true of the gear shift clutch 16, so that the double loose wheel 44 does not transmit any torque to the first output shaft 8 and, as an idle gear wheel, serves only to transmit torque from the input shaft 5 to the third output shaft 26.

When the first forward gear I is selected, the torque of the input shaft 5 is transmitted to the loose wheel 33 by the fixed wheel 13f, by the double loose wheel 45 and by the gear wheels 31, 32, said loose wheel 33 now being rotationally fixedly connected to the third output shaft 26 by means of the closed gear shift clutch 34.

FIG. 4 shows a further exemplary embodiment of the invention: a twin-clutch gearbox having seven forward gears I, II, . . . , VII and one reverse gear. The change-speed gearbox which is illustrated here is of fundamentally the same construction as the change-speed gearbox in the FIG. 3, but comprises two input shafts 5, 6. The diameters of the individual gear wheels are also selected to be different, so that different transmission ratios are formed, and correspondingly different positions for the individual forward gears within the gearbox result.

The forward gears II, IV and VI and the reverse gear R are assigned to the first input shaft 5, while the forward gears I, III, V and VII are assigned to the second input shaft 6. These assignments make shifting between two consecutive gears under load possible in the twin-clutch gearbox. The parking wheel 28 is arranged on the second output shaft 9 but can also, for example, alternatively be arranged on the third output shaft 26, as illustrated in FIG. 1.

It should be pointed out that the change-speed gearboxes in FIGS. 3 and 4 can also be equipped with the drive units 35, 36 of the change-speed gearbox in FIGS. 1 and 2. The change-speed gearbox in FIGS. 1 and 2 can fundamentally also be provided with a mechanical reverse gear.

| List of reference designations | |
|---|---|
| 1 | Change-speed gearbox (1) |
| 2 | $1^{st}$ clutch |
| 3 | $2^{nd}$ clutch |
| 4 | Internal combustion engine |
| 5 | $1^{st}$ input shaft |
| 6 | $2^{nd}$ input shaft |
| 7 | Axis |
| 8 | $1^{st}$ output shaft |
| 9 | $2^{nd}$ Output shaft |
| 10 | Gear wheel pair (10l loose wheel, 10f fixed wheel) |
| 11 | Gear wheel pair (11l loose wheel, 11f fixed wheel) |
| 12 | Gear wheel pair (12l loose wheel, 12f fixed wheel) |
| 13 | Gear wheel pair (13l loose wheel, 13f fixed wheel) |
| 14 | Gear wheel pair (14l loose wheel, 14f fixed wheel) |
| 15 | Gear shift clutch |
| 16 | Gear shift clutch |
| 17 | Gear shift clutch |
| 18 | Gear shift clutch |
| 19 | Gear shift clutch |
| 20 | Gear wheel |
| 21 | Ring gear |
| 22 | Differential |
| 23 | $1^{st}$ axle |
| 24 | $2^{nd}$ axle |
| 25 | Gear wheel |
| 26 | $3^{rd}$ output shaft |
| 27 | Gear wheel |
| 28 | Parking wheel |
| 29 | Gearbox unit |
| 30 | Intermediate shaft |
| 31 | Gear wheel |
| 32 | Gear wheel |
| 33 | Loose wheel |
| 34 | Gear shift clutch |
| 35 | $1^{st}$ drive unit |
| 36 | $2^{nd}$ drive unit |
| 37 | Gear wheel |
| 38 | Chain |
| 39 | Rotational axis |
| 40 | Angle |
| 41 | Angle |
| 42 | Angle |
| 43 | Angle |
| 44 | Double loose wheel (44a, 44b gear wheel parts) |
| 45 | Double loose wheel (45a, 45b gear wheel parts) |
| 46 | Loose wheel |
| 47 | Gear shift clutch |
| 48 | Gear shift clutch |

The invention claimed is:

1. A change-speed gearbox, in particular for motor vehicles, comprising:
   at least one input shaft which can be connected to an engine by means of a clutch;
   at least one first, second and third output shaft;
   drive outputs engaged with said first, second and third output shafts, respectively;
   several gear wheel pairs for connecting the at least one input shaft to the first output shaft or to the second output shaft, at least one of the gear wheel pairs comprising one fixed wheel and one loose wheel;
   a shaft bearing the at least one loose wheel;
   a gear shift clutch assigned to the loose wheel that is connectable by means of said gear shift clutch in a rotationally fixed manner to the shaft bearing that loose wheel, resulting in selection of a forward gear; and
   a gearbox unit that engages with one of the loose gear wheels of one of the gear wheel pairs in order to connect the at least one input shaft to the third output shaft engaging with the respective drive output,
wherein
the gearbox unit comprises:
at least one gearbox unit loose wheel;
a gear shift clutch assigned to the gear box unit loose wheel, wherein a further forward gear can be implemented by means of the gearbox unit; and
wherein an auxiliary drive is provided.

2. The change-speed gearbox as claimed in claim 1, wherein the auxiliary drive allows the drive output to rotate in a direction counter to the forward gears.

3. The change-speed gearbox as claimed in claim 2, wherein the auxiliary drive is operatively connected to the at least one input shaft.

4. The change-speed gearbox as claimed in claim 1, wherein a second input shaft is provided which is arranged coaxially with respect to the first input shaft, wherein the second input shaft is connectable to the engine by means of a second clutch.

5. The change-speed gearbox as claimed in claim 1, wherein the auxiliary drive comprises two drive units which are each operatively connected to a respective input shaft.

6. The change-speed gearbox as claimed in claim 1, wherein the auxiliary drive comprises at least one electric machine.

7. The change-speed gearbox as claimed in claim 5, wherein at least one drive unit of the auxiliary drive is arranged coaxially with respect to the at least one input shaft or to the input shafts.

8. The change-speed gearbox as claimed in claim 7, wherein the drive unit which is arranged coaxially with respect to the input shaft or to the input shafts engages around the first clutch and/or the second clutch in the radial direction.

9. The change-speed gearbox as claimed in claim 5, wherein one drive unit of the auxiliary drive is connected to one of the input shafts by means of a chain.

10. The change-speed gearbox as claimed in claim 1, wherein the gearbox unit comprises a first gear wheel which meshes with a gear wheel of the gear wheel pair which engages with the gearbox unit, said first gear wheel rotating about an axis which is different than an axis of the third output shaft.

11. The change-speed gearbox as claimed in claim 10, wherein the gearbox unit comprises a second gear wheel which is arranged on the third output shaft and is operatively connected to the first gear wheel.

12. The change-speed gearbox as claimed in claim 10, wherein the gearbox unit comprises an intermediate shaft having a third gear wheel.

13. The change-speed gearbox as claimed in claim 10, wherein the second gear wheel is embodied as a loose wheel.

14. The change-speed gearbox as claimed in claim 1, wherein each of the fixed wheels of the respective gear wheel pairs are arranged on the first input shaft or on the first and second input shafts.

15. The change-speed gearbox as claimed in claim 1, wherein one of the fixed wheels of one of the first gear wheel pairs forms the fixed wheel of a second gear wheel pair.

16. The change-speed gearbox as claimed in claim 1, wherein in order to transmit torque to the drive output, each output shaft bears a respective pinion or small gear wheel in a rotationally fixed manner.

17. The change-speed gearbox (1) as claimed in claim 1, wherein the first and second output shafts are level in-plane and the at least one input shaft is provided at a distance therefrom.

18. The change-speed gearbox as claimed in claim 1, wherein a gearbox housing is provided for holding the shafts and wherein one gear wheel is arranged to transmit torque to the third output shaft in the reverse gear, the gear wheel being embodied as a loose wheel.

19. The change-speed gearbox as claimed in claim 18, wherein the gear wheel for a reverse gear engages with a double loose wheel which comprises a first gear wheel part and a second gear wheel part, the first gear wheel part being used as a loose wheel of a gear wheel pair for a forward gear, preferably for the second forward gear, and the second gear wheel part meshing with the gear wheel for the reverse gear R, and a diameter of the first gear wheel part being larger than a diameter of the second gear wheel part.

20. The change-speed gearbox as claimed in claim 1, wherein the gearbox has seven forward gears.

* * * * *